(12) United States Patent
Izume

(10) Patent No.: US 6,837,471 B2
(45) Date of Patent: Jan. 4, 2005

(54) CUP HOLDER DEVICE

(75) Inventor: Tomoharu Izume, Toyonaka (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/440,356

(22) Filed: May 19, 2003

(65) Prior Publication Data
US 2004/0021050 A1 Feb. 5, 2004

(30) Foreign Application Priority Data

Aug. 5, 2002 (JP) ........................................ 2002-226893

(51) Int. Cl.[7] .................................................. A47K 1/08
(52) U.S. Cl. ..................................... 248/311.2; 224/926
(58) Field of Search .......................... 248/311.2, 309.1, 248/284.1; 224/281, 539, 542, 926, 282; 296/37.12, 37.14; 312/319.1; 297/188.01, 188.08, 188.15, 188.16, 188.17, 188.19

(56) References Cited

U.S. PATENT DOCUMENTS

| | | | | |
|---|---|---|---|---|
| 5,342,009 A | * | 8/1994 | Lehner | ..................... 248/311.2 |
| 5,379,978 A | * | 1/1995 | Patel et al. | ............... 248/311.2 |
| 5,845,888 A | * | 12/1998 | Anderson | ................ 248/311.2 |
| 6,427,960 B1 | * | 8/2002 | Gehring et al. | .......... 248/311.2 |

FOREIGN PATENT DOCUMENTS

| | | | | |
|---|---|---|---|---|
| JP | 08-318775 | * | 12/1996 | ............ B60N/3/10 |
| JP | 11-227512 | * | 2/1998 | ............ B60N/3/10 |
| JP | 2001-347874 | * | 12/2001 | |

* cited by examiner

Primary Examiner—Gwendolyn Baxter
(74) Attorney, Agent, or Firm—Manabu Kanesaka

(57) ABSTRACT

A cup holder device includes a case; a tray movable between a stored position and a pullout position; first and second supporting links movable upward with an urging force around base ends; and a holder. A front end of the holder is rotatably connected to the second supporting link, and a rear end of the holder is connected to the first supporting link to slide freely. The holder moves between a non-use position where the holder is stored in the tray and a use position where the holder moves up from the tray. The first supporting link includes projected parts projecting at edges of base ends. When the first and second supporting links move upward, the projected parts are arranged to move to contact the tray and push the tray with a gradually increasing force.

7 Claims, 9 Drawing Sheets

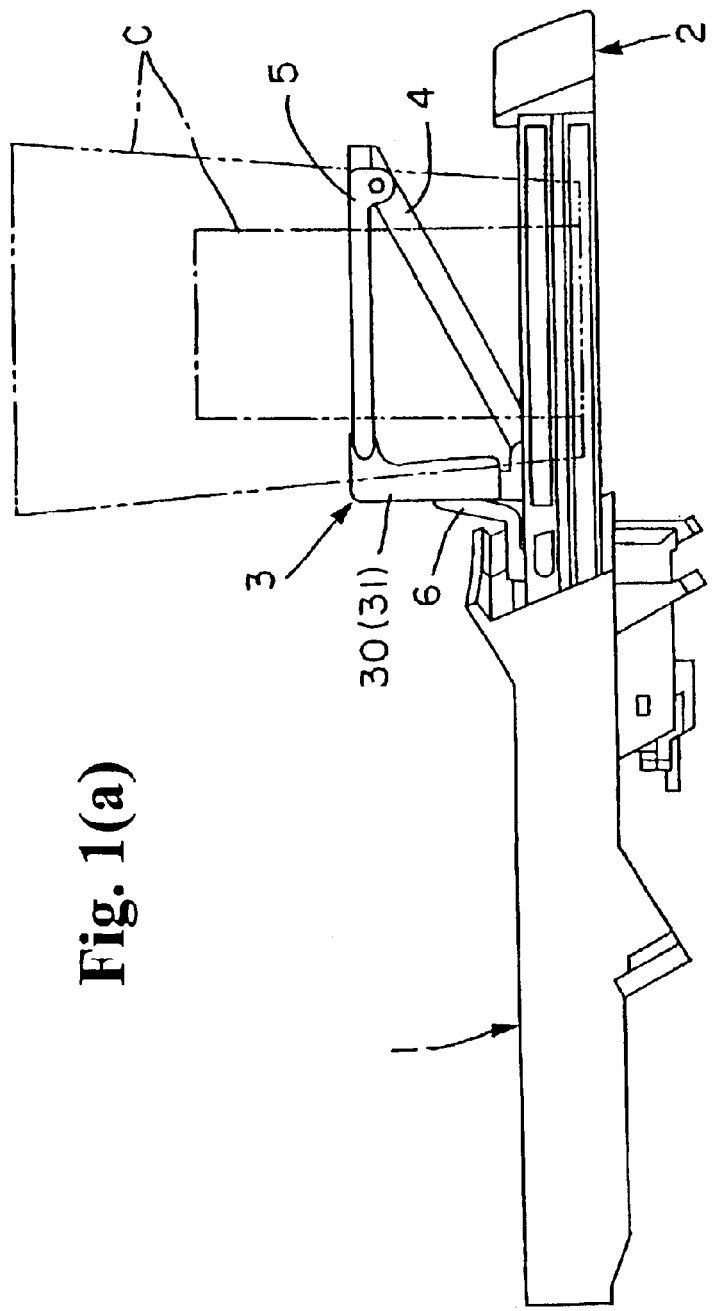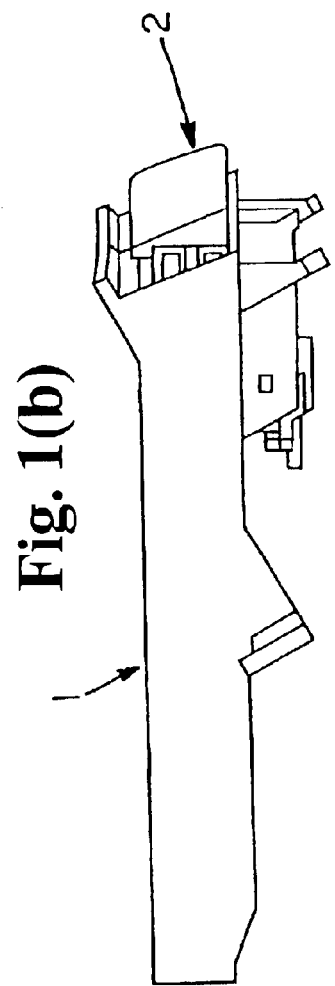

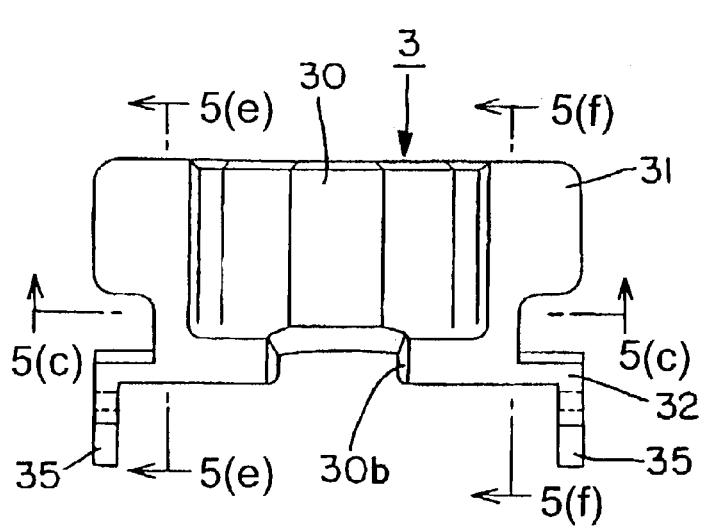
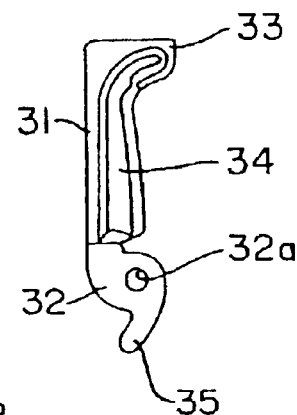
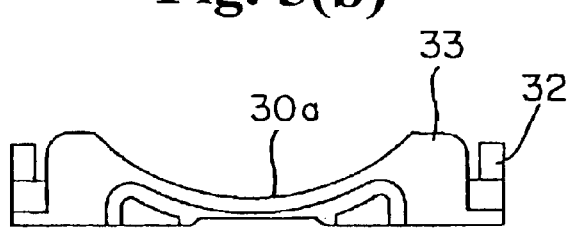
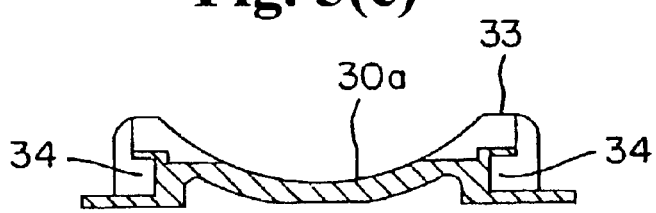
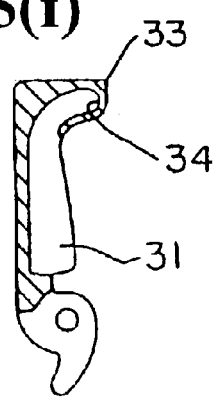

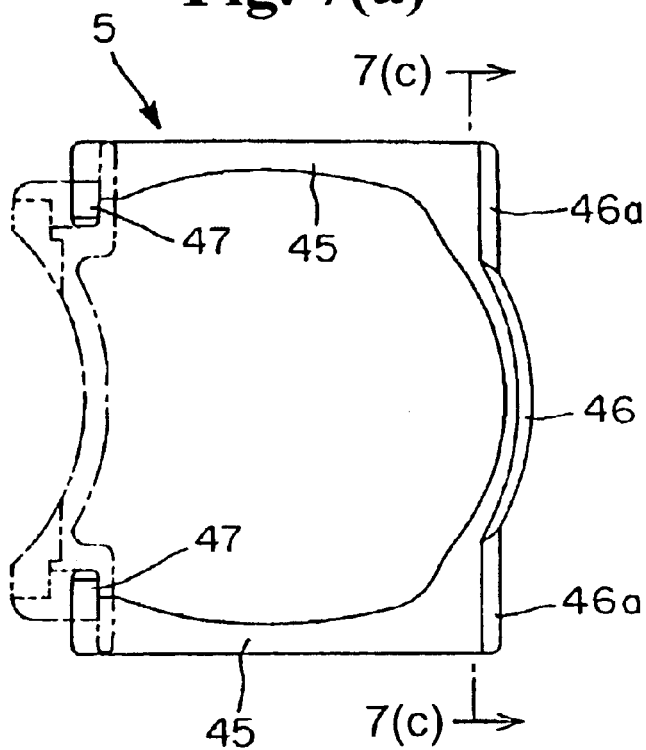
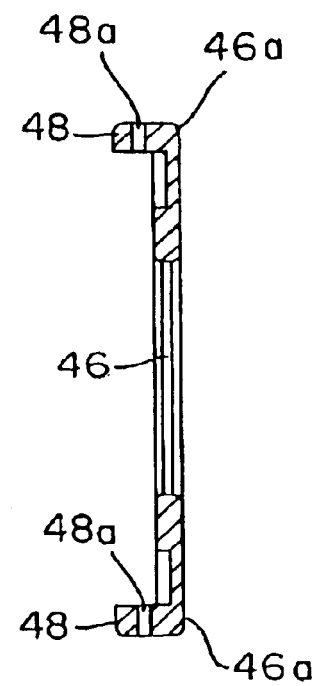
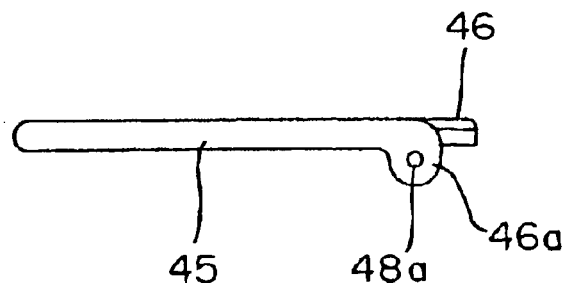
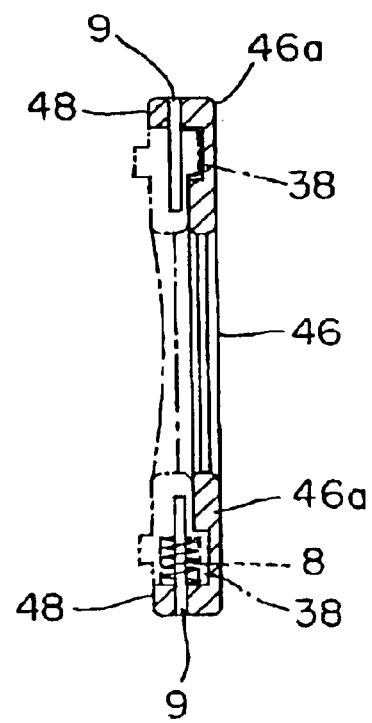

CUP HOLDER DEVICE

BACKGROUND OF THE INVENTION AND RELATED ART STATEMENT

The present invention relates to a pullout type cup holder device equipped inside a vehicle, ship, or aircraft for holding a container such as a can, cup, or drink box of beverage.

A pullout type cup holder device is installed in, for example, an instrument panel of a vehicle, and an occupant pulls out the holder for holding a periphery of a container as needed. The pullout type holder includes an uprising type in which the holder stands upward relative to a tray and a suspensory type in which the holder lowers relative to a tray.

FIGS. 9(a)–(b) show two conventional uprising type devices disclosed in Japanese Patent Publications (Tokkai) No. 8-26013 and No. 2001-347874. Both devices include trays 51, 61 which is able to switch between a stored position and a pullout position relative to cases 50, 60; and holders 52, 62 which is able to switch between a non-use position stored in the trays 51, 61 at the stored position and in a use position of standing up from the trays 51, 61 at the pullout position. Both devices similarly hold a periphery of a container C placed on the trays 51, 61 with the holders 52, 62. Both devices have different structures for supporting the holders.

In the supporting structure shown in FIG. 9(a), an urging member urges the holder 52 in a direction toward the use position of standing up relative to the tray 51. The holder 52 is supported to be rotatable through a guide mechanism having axis parts 53, 54 provided on the holder 52 for fitting in curved long hole 55 provided in the case 50. When the tray 51 is pulled out, the holder 52 switches to the use position while moving toward a front side relative to the tray 51.

The supporting structure shown in FIG. 9(b) includes a link mechanism for switching the holder 62 from the non-use position to the use position through supporting links 63, 64 moving upward with base ends, or axes P1, P2, relative to the tray 61. The supporting structure in FIG. 9(b) also includes a stay 65 for supporting and reinforcing the supporting link 64. The base end of the supporting link 63 is supported on a bracket 61a through the axis P1, and the other end of the supporting link 63 is supported on a front side of the holder 62 through an axis P3. The supporting link 63 is urged toward a stand-up position with urging members 66 disposed between the supporting links 63 and the bracket 61a. An urging spring (not shown) disposed between the supporting link 63 and the holder 62 urges the supporting link 63 to move the holder 62 to the use position shown in FIG. 9(b).

The base end of the supporting link 64 is supported on a bracket 61b through the axis P2, and the other end of the supporting link 64 is connected to a guide groove 67 provided at a back side of the holder 52 through an axis 68 to slide. The supporting link 64 moves up and down along with the supporting link 63 to support the holder 62 between the supporting link 64 and the supporting link 63 in a horizontal position. The stay 65 is supported through an axis P4 at the end of the supporting link 63. The stay moves between a position placed along the tray 61 and a standing up position shown in FIG. 9(b) for supporting the supporting link 63, along with the movement of the supporting links 63.

The supporting structure shown in the FIG. 9(a) includes the holder 52 and the simple guide mechanism, thereby making the structure simple and reducing a cost compared to that shown in FIG. 9(b). However, in the use position, when the container C is taken in and out of the holder, or the holder 52 is hit by an occupant or an object, the holder 52 is inadvertently switched to the non-use position upon receiving a load F in the arrow direction in FIG. 9(a), thereby making it difficult to hold the container C securely.

On the other hand, in the supporting structure shown in FIG. 9(b), the stay 65 is attached to the supporting link 63 to support when both supporting links 63, 64 move upward with the urging members 66. Therefore, it is difficult to inadvertently switch to the non-use position even if a relatively large load F is exerted on the holder 62. However, in this supporting structure, the stay 65 needs to move to the uprising position to a certain extent as shown in FIG. 9(b). Therefore, the stay 65 is difficult to move down when a load F is applied downward. Further, it is possible to be damaged when the stay 65 receives an excessive load. When it is designed that the stay 65 has a small standing angle relative to the tray 61, the stay 65 does not support the tray effectively. Further, the stay 65 is urged in an opening direction (counterclockwise rotation in the figure) with the spring member (not shown) to move to the uprising position, thereby making it difficult to solve the above problems.

In other words, a cup holder device is required to hold the container securely even when the downward load F is relatively large, and also to move smoothly downward, or to the non-use position when the lower load F becomes excessive, thereby eliminating the damage. However, in the conventional structure shown in FIG. 9(a), it is difficult to hold the container securely, even though it is hard to be damaged. In the conventional structure shown in FIG. 9(b), it is easy to be damaged, even though the device can hold the container securely. From a design point of view, in addition to solving the abovementioned problems, it is preferred to reduce the number of the members and improve the assembling process, thereby reducing a manufacturing cost.

The present invention has been proposed from the abovementioned background. An object of the present invention is to provide a cup holder device that meets the requirements with a variety of designs to improve reliability.

Another object of the invention is to provide a cup holder device as stated above, which can reduce the manufacturing cost by reducing the number of the members and improve the assembly process.

Further objects and advantages of the invention will be apparent from the following description of the invention.

SUMMARY OF INVENTION

In order to achieve the above objectives, according to the present invention, a cup holder device includes a case; a tray movable between a stored position and a pullout position; first and second supporting links movable upward with an urging force around base ends thereof; and a holder. A front end of the holder is connected to the first supporting link to be rotatable. A rear end of the holder is connected to the first supporting link to slide freely. The holder moves between a non-use position where the holder is stored in the tray at the stored position and a use position where the holder stands up from the tray at the pullout position. The holder holds a container placed on the tray. The first supporting link is connected to the rear end of the holder, and includes projected parts projecting at edges of base ends. When the first and second supporting links move upward, the projected parts are arranged to move to contact the tray and push the tray with a gradually increasing force.

In the cup holder device, when the tray moves from the stored position to the pullout position, the first and second supporting links move the holder to the use position. The first supporting link is connected to the rear end of the holder, and includes the projected parts projecting at the edges of the base ends. When the first and second supporting links move upward, the projected parts are arranged to move to contact the tray and push the tray with a gradually increasing force.

The first supporting link pushes the tray through the projected parts, thereby creating friction. An axis support portion (an axis and axial holes) at the base ends of the first supporting link is restrained in one direction, thereby eliminating a play. Therefore, the holder is easy to maintain the standing state even when a relatively large load is applied to the holder. Further, the holder can easily move to the nonuse position when an excessive load is applied, thereby eliminating damage.

In the configuration of the invention, it is possible to adjust a range of the force that the holder supports (preferably the holder supports a force in a range of 0.6–1.0 kg.f, and moves down beyond the range) by changing a degree of tightness at the axis support portion of the first supporting link.

The holder is formed in a roughly horseshoe shape, and holds a periphery of the container at the inside thereof. The first supporting link includes a plate disposed between both ends of the horseshoe shape holder for holding the peripheral of the container with the holder. The projected parts are formed on the base ends at lower both sides of the plate. Therefore, it is easy to simplify the holder, and secure a space for the first supporting link. Further, it is easy to create the friction and eliminate play through the projected parts at both sides.

An urging member is disposed between the first supporting link and the second supporting link for urging the first supporting link to move upward to a roughly vertical position around the base ends. The first supporting link also includes guide grooves on both sides of the plate. Axis parts are provided on both sides of the holder for fitting in the guide grooves to slide freely therein. That is, the first supporting link and the holder move in a specific way. Therefore, when the holder moves, the first supporting link is located at a stable position (roughly vertical position) through the projected parts, and the first supporting link supports the holder securely.

A front side of the second supporting link is connected to the holder. A spring member is disposed between the second supporting link and the holder for urging the holder from the non-use position to the use position. Base ends of the second supporting link are supported on the tray, and also support the base ends of the first supporting link. Therefore, it is possible to assemble the components to the tray in a unit. Further, it is possible to eliminate a play at the second supporting link similar to the projected parts of the second supporting link.

The second supporting link has front ends having a level higher than the base ends thereof, and includes projections projecting at the base ends in a rear direction. When the front ends support the holder at the use position, the projections abut against the tray. The second supporting link is arranged with a specific angle relative to the tray, and tends to be unstable. Therefore, the second supporting link is arranged to be stable by the design and the projections when the holder is at the use position.

BRIEF DESCRIPTION OF THE DRAWINGS

FIGS. 1(a)–1(b) are side views showing a cup holder device according to an embodiment of the invention;

FIGS. 5(a)–5(f) are views showing the first supporting link of the cup holder device;

FIGS. 7(a)–7(d) are views showing a holder of the cup holder device;

DETAILED DESCRIPTION OF PREFERRED EMBODIMENTS

Figure 2:
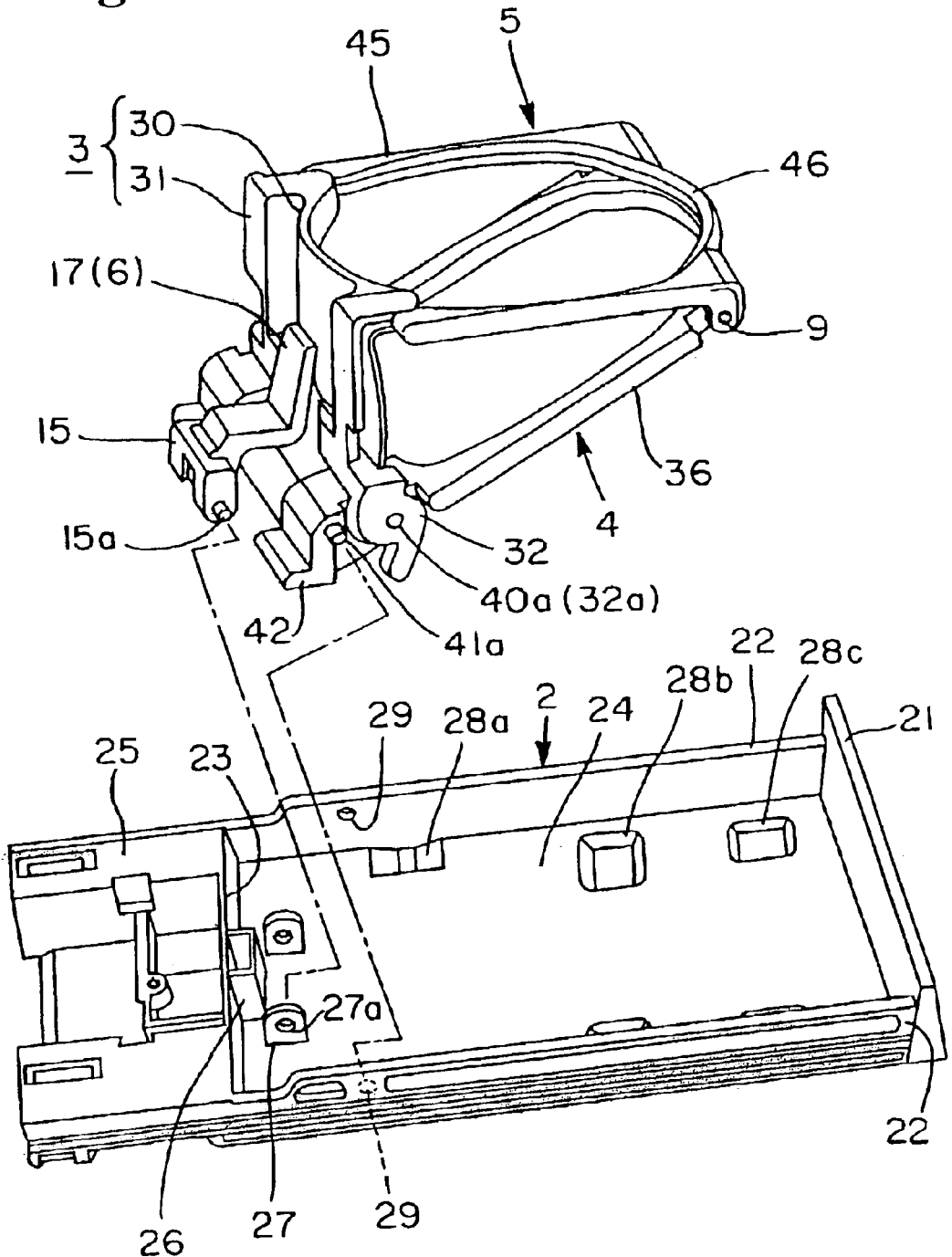
FIG. 2 is a view showing a relationship between essential parts of the cup holder device and a tray shown in FIGS. 1(a)–1(b)
Figure 3:
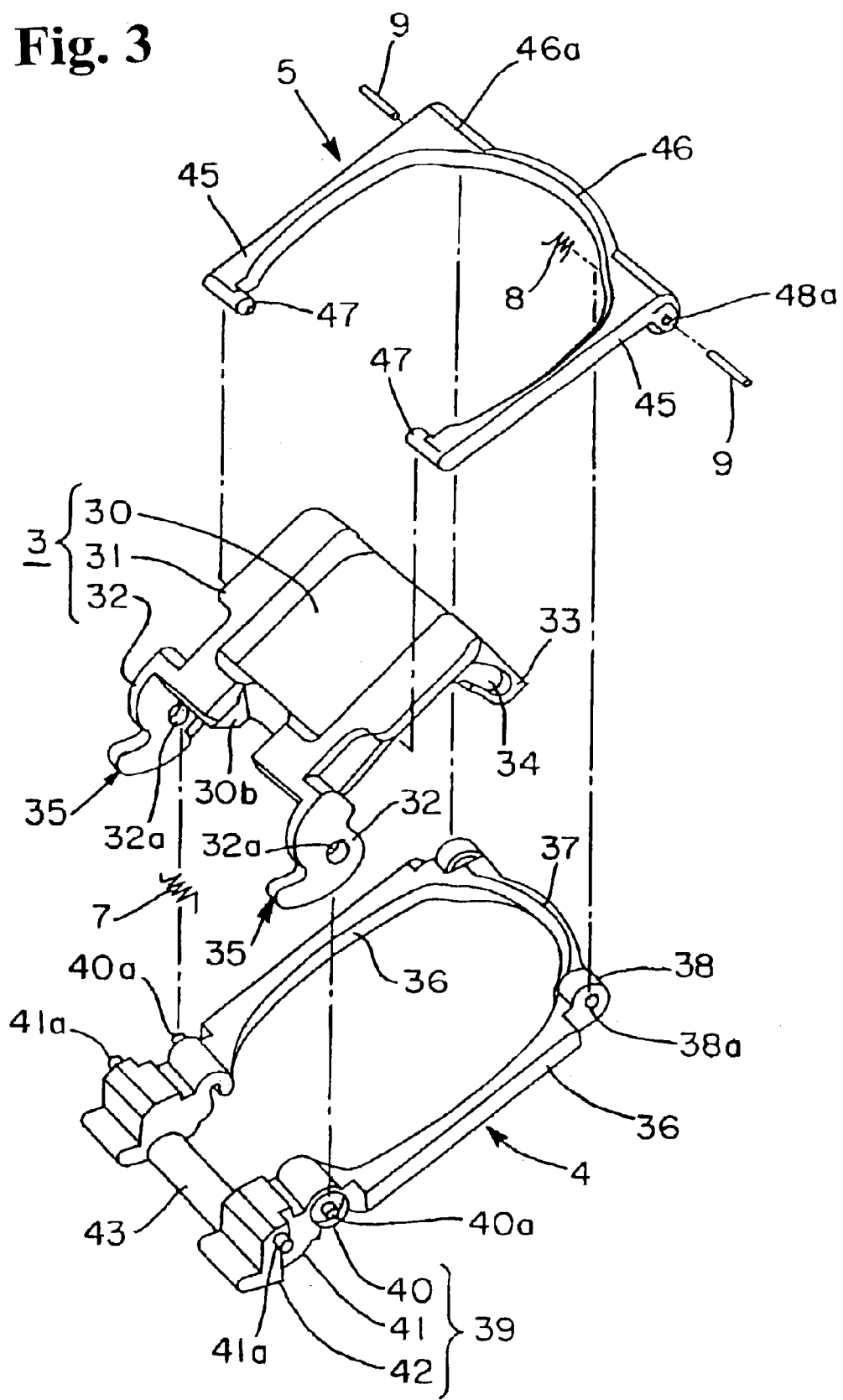
FIG. 3 is an exploded perspective view showing the essential parts of the cup holder device shown in FIG. 2.
Figure 4A:
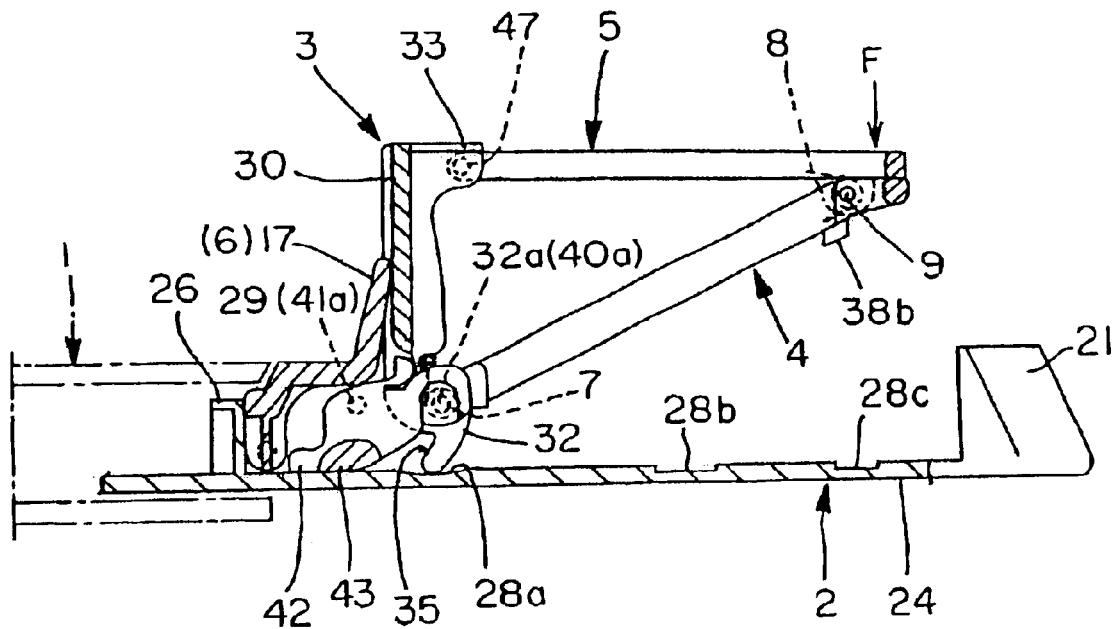
FIGS. 4(a)–4(b) are views showing an operation of the essential parts of the cup holder device shown in FIGS. 1(a)–1(b)
Figure 4B:
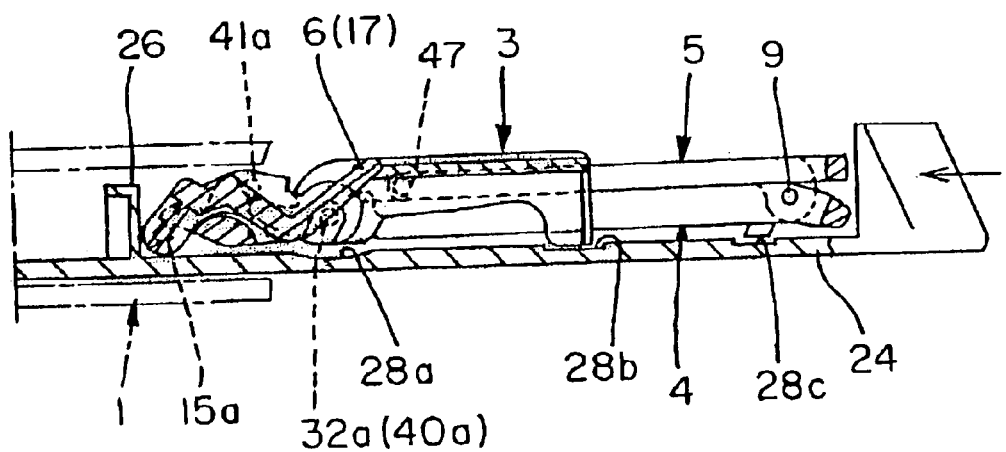

Hereunder, embodiments of the present invention will be explained with reference to the accompanying drawings. FIGS. 1(a)–1(b) to FIGS. 8(a)–8(c) are views showing a cup holder device according to the present invention. FIGS. 1(a)–1(b) are side views showing the cup holder device, wherein FIG. 1(a) is a side view showing a pullout position where the tray is pulled out, and FIG. 1(b) is a side view showing a stored position where the tray is pushed in. FIG. 2 is a view showing a relationship between supporting links, assembling members of a holder, and a tray of the cup holder device. FIG. 3 is an exploded view showing a relationship between the supporting links and the holder. FIGS. 4(a)–4(b) are views showing an operation of the cup holder device, wherein FIG. 4(a) is a cross sectional view showing the pullout position where the tray is pulled out, and FIG. 4(b) is a cross sectional view showing a state where the tray is slightly moved to the stored position.

Figure 6A:
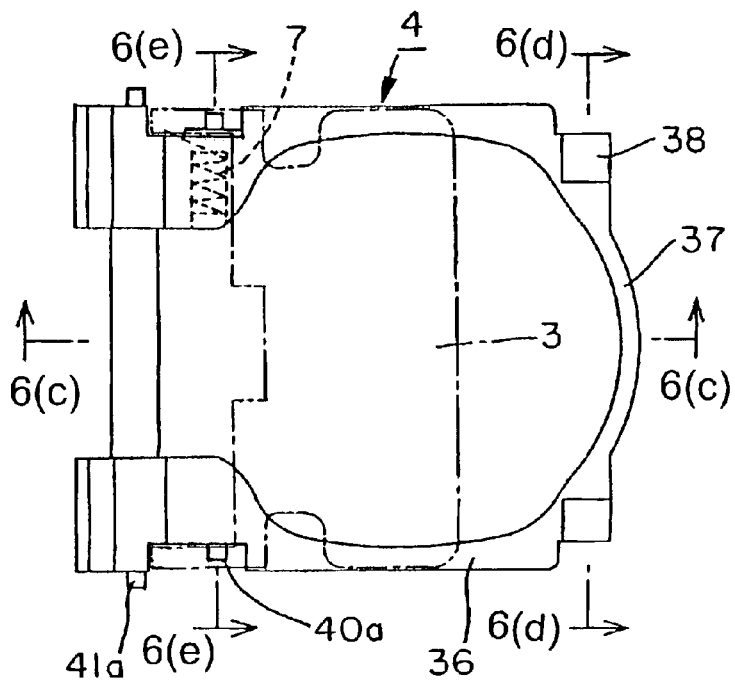
FIGS. 6(a)–6(e) are views showing the second supporting link of the cup holder device.
Figure 6D:
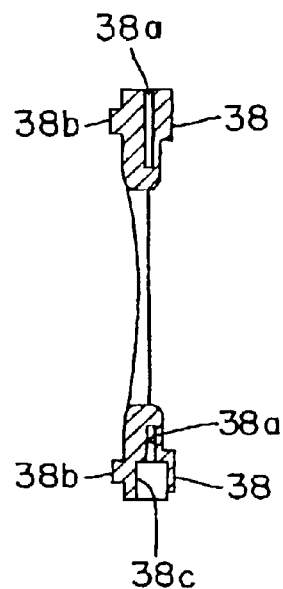
Figure 6B:
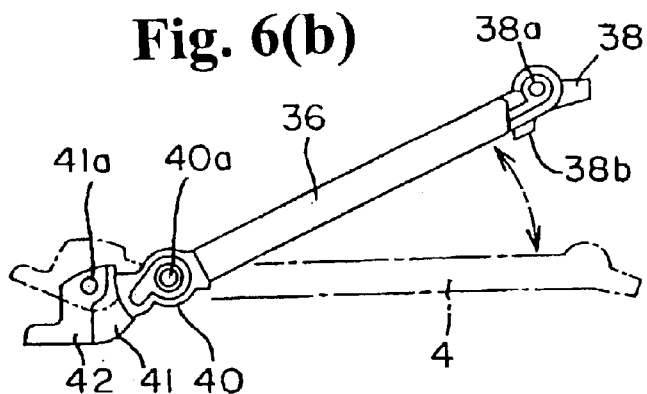
Figure 6E:
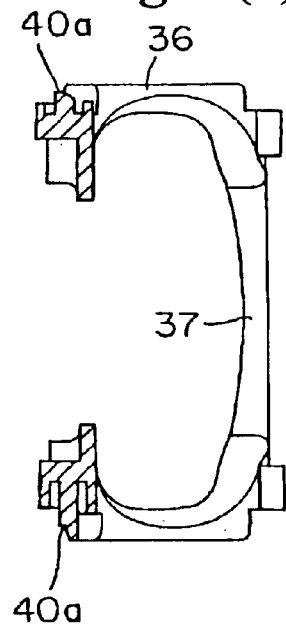
Figure 6C:
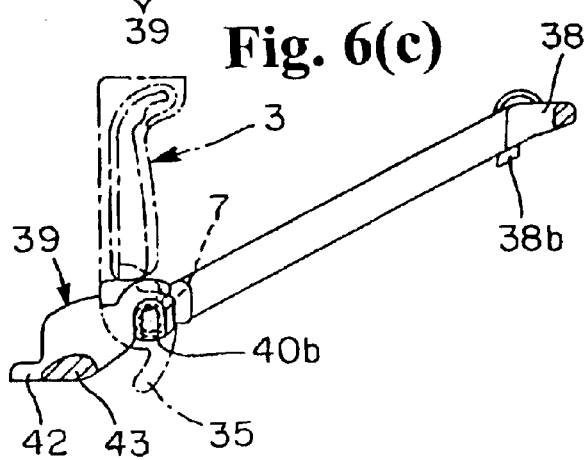

FIGS. 5(a)–5(f) are views showing the first supporting link, wherein FIG. 5(a) is a rear view thereof, FIG. 5(b) is a top view thereof, FIG. 5(c) is a cross sectional view thereof taken along line 5(c)—5(c) in FIG. 5(a), FIG. 5(d) is side view thereof, FIG. 5(e) is a cross sectional view thereof taken along line 5(e)—5(e) in FIG. 5(a), and FIG. 5(f) is a cross sectional view thereof taken along line 5(f)—5(f) in FIG. 5(a). FIGS. 6(a)–6(e) are views showing the second supporting link, wherein FIG. 6(a) is a front view thereof, FIG. 6(b) is a side view thereof, FIG. 6(c) is a cross sectional view thereof taken along line 6(c)—6(c) in FIG. 6(a), FIG. 6(d) is a cross sectional view thereof taken along line 6(d)—6(d) in FIG. 6(a), and FIG. 6(e) is a cross sectional view thereof taken along line 6(e)—6(e) in FIG. 6(a).

Figure 8A:
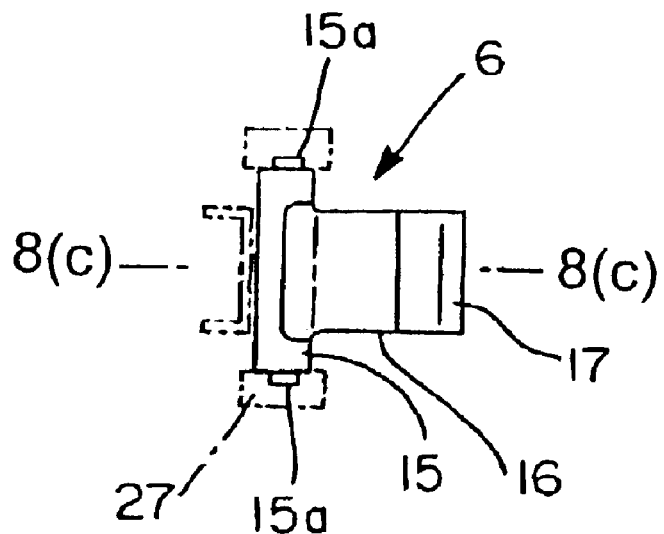
FIGS. 8(a)–8(c) are views showing a push-arm of the cup holder device.
Figure 8B:
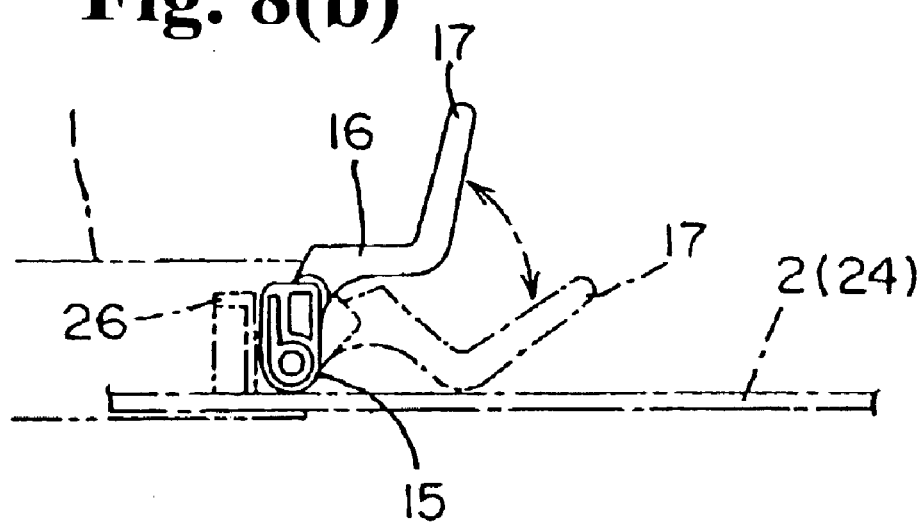
Figure 8C:
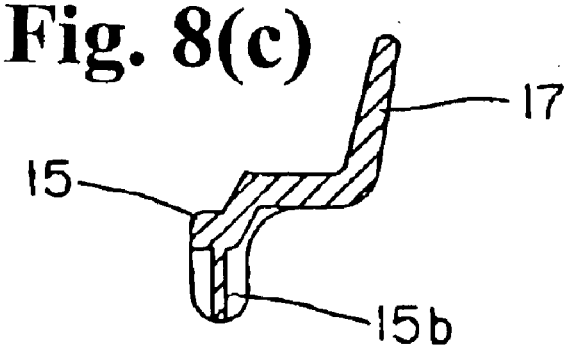
Figure 9A:
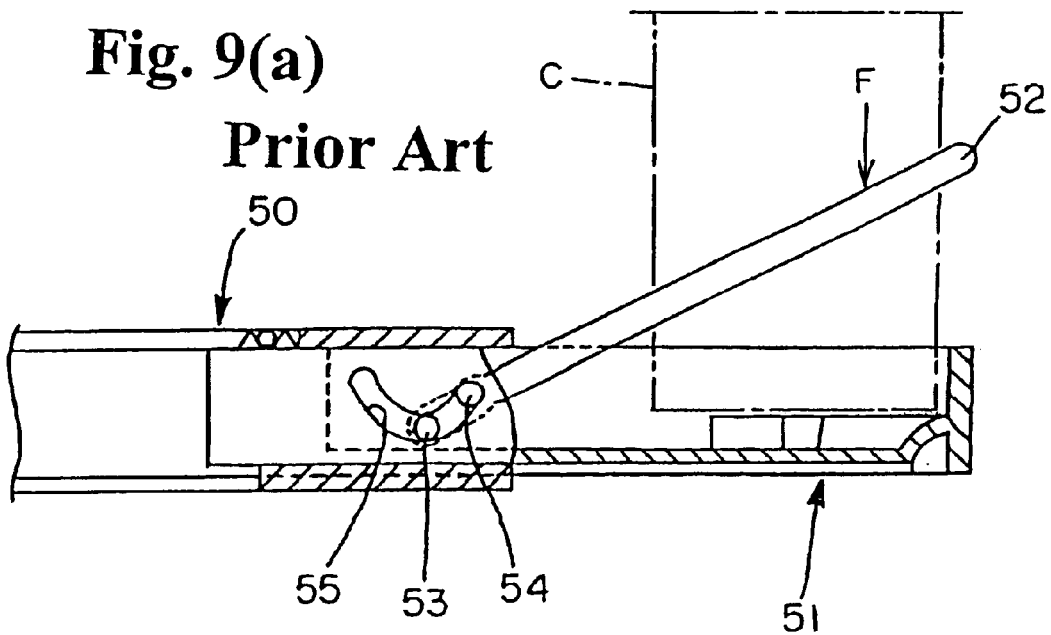
FIGS. 9(a)–9(b) are views showing two conventional cup holder devices.
Figure 9B:
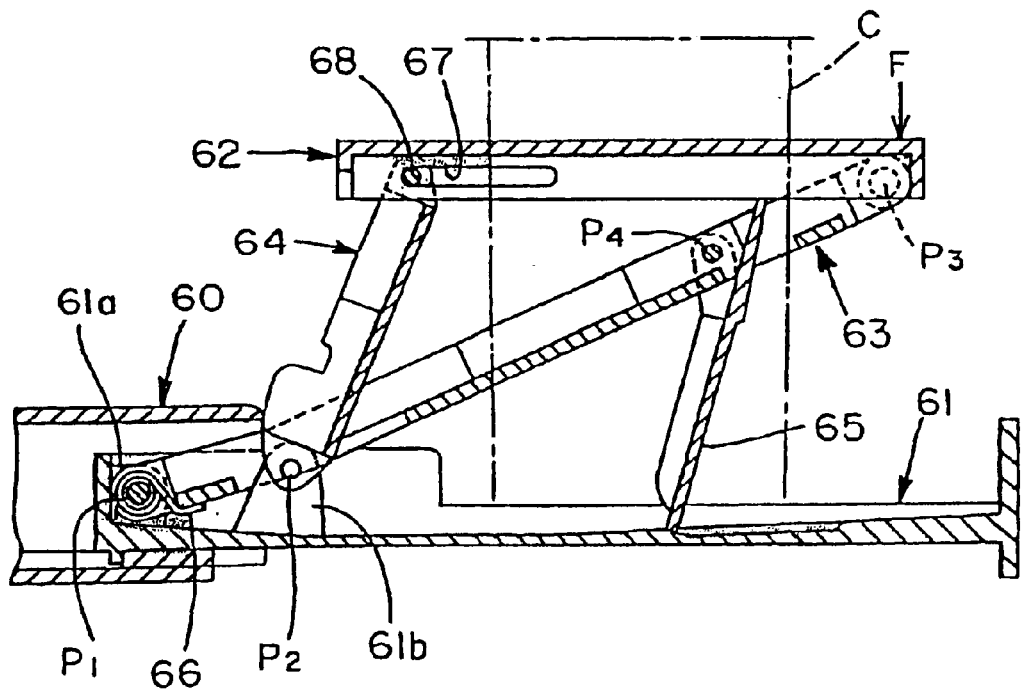

FIGS. 7(a)–7(d) are views showing the holder, wherein FIG. 7(a) is a front view thereof, FIG. 7(b) is a side view thereof, FIG. 7(c) is a cross sectional view thereof taken along line 7(c)—7(c) in FIG. 7(a), and FIG. 7(d) is a view showing a connecting configuration with the second supporting link. FIGS. 8(a)–8(c) are views showing a push-arm, wherein FIG. 8(a) is a front view thereof, FIG. 8(b) is a side view thereof, and FIG. 8(c) is a cross sectional view thereof taken along line 8(c)—8(c) in FIG. 8(a). Hereinafter, an overall outline, a configuration of essential parts, an assembly, and an operation of the cup holder device will be explained in this order.

In the cup holder device of the embodiment, a case 1 is provided in an instrument panel inside a vehicle, and a tray 2 moves between a stored position and a pullout position relative to the case 1. A holder 5 is provided on the tray 2, and supporting links 3, 4 raise the holder 5 so that the holder 5 holds a container C placed on the tray 2. An urging device (not shown) urges the tray 2 toward the pullout direction relative to the case 1. The tray 2 is pushed into the stored position against the urging force, and a locking device provided between the case 1 and the tray 2 locks the tray. The locking device may have a push and push engagement mechanism disclosed in Japanese Patent Publication (Tokkai) No. 07-3123773 for a smooth operation and a good appearance.

When the tray 2 is pushed into the stored position against the urging force of the urging device, the push and push engagement mechanism locks the tray. When the tray is pushed further, the tray 2 is released from the stored position. The locking device may use a mechanism other than the push and push engagement mechanism. The supporting links 3, 4 support the holder 5 along with a push-arm 6. The cup holder device may be installed in a location other than the instrument panel, such as a part of a center console, and so on. The case 1, tray 2, supporting arms 3, 4, and push-arm 5 are formed of a resin, but, the material can be other than the resin.

A structure for supporting the holder includes the supporting link 3 standing in a roughly vertical position relative to the tray 2 and the supporting link 4 standing with an angle smaller than that of the supporting link 3. The supporting link 3 supports a backside of the holder 5 to slide freely, and a front side of the holder 5 is pivotally supported on the supporting link 4. An urging member 7 is disposed between the supporting links 3, 4 for urging the supporting links to move away from each other. A spring member 8 is disposed between the supporting link 4 and the holder 5 for urging the tray to move away from the supporting link 4 to a use position. The supporting link 4 pivotally supports the tray 2, and the supporting link 3 pivotally supports the supporting link 4. The supporting link 3 has projected parts 35 at base ends 32 thereof, and the supporting link 4 has projections 42 at base ends 39 thereof.

The tray 2 has spaces for the container C, the supporting links 3, 4, the holder 5 in a folded state, and the push-arm 6. In this embodiment, a front face wall 21, sidewalls 22, a back wall 23, and a bottom wall 24 divide the inside of the tray. The locking device and the urging device are placed in a back part 25 behind the back wall 23.

The back part 25 of the tray 2 is always situated in the case 1. The tray 2 moves between the pullout position, where the tray is pulled out forward as shown in FIG. 1(a), and the stored position, where the tray is pushed inside as shown in FIG. 1(b), through a guide device (not shown) provided between the case 1 and the tray 2. As shown in FIG. 2, the bottom wall 24 includes a stopper 26 located at the middle of the width and between the back wall 23 and the bottom wall; a supporting piece. 27 having a pair of axial holes 27a provided in front of the stopper 26; and depressed parts 28a, 28b, 28c at the back side, the middle, and the front side, respectively. Each of the depressed parts is provided close to the sidewalls 22. The depressed parts 28a correspond to the projected parts 35 of the supporting link 3, the depressed parts 28b correspond to edges 33 of the supporting link 3, and the depressed parts 28c correspond to the holder 5. Buffer cushions (not shown) are disposed in the depressed parts 28b, 28c. Axial holes 29 are provided in opposed inner faces of the sidewalls 22 at a rear side.

As shown in FIG. 3 and FIGS. 5(a)–5(f), the supporting link 3 includes a plate 30 as a main part; sides 31 of the plate 30; base ends 32 projecting downward at the sides; and edges 33 formed at an upper sides of the plate 30. The plate 30 has the edges 33 projecting forward in a roughly reversed L-shape, and a curved front face including the edges 33. The curved part 30a holds a periphery of the container along with the holder 5.

A notch 30b is formed at the middle of a lower portion of the plate 30 to divide the lower portion. Guide grooves 34 are formed in the sides 31 and extend downward from the edges 33. The base ends 32 at both sides are sectioned with a space between both sides 31, and have roughly a circular-disc shape. Axial holes 32a are formed to pass through a center of the base ends 32, and projected parts 35 are projected below the base ends. The projected parts 35 are slightly inclined toward the rear side, and also have edges with a rounded shape.

As shown in FIG. 3 and FIGS. 6(a)–6(e), the supporting link 4 has a total length longer than that the supporting link 3 and forms a roughly U-shape with side pieces 36 and a front piece 37. Base ends 39 of the side pieces 36 are connected with each other through a back piece 43, and form a roughly short framed shape. The side pieces 36 are provided side by side with a space in between equal to a width of the supporting link 3. The front piece 37 has a gentle curved shape, and circular bosses 38 are formed in notched parts at both sides.

The circular bosses 38 are provided with pin holes 38a with bottoms, abutted parts 38b abutting against the tray 2, and a spring placement space 38c at one side. Base ends 39 are formed of parts 40 connected to each side piece 36 to engage the supporting link 3; parts 41 connected to parts 40 for receiving the circular-disc base ends 32; and projections 42 connected to the parts 41. The parts 40 are provided with axis parts 40a projecting outside and a spring placement space 40b at one side. The projection 42 has an L-shaped horizontal piece joined with the part 41, and an axis part 41a projecting (projected outside further than the axis parts 40a) on horizontal portion of the L-shaped piece. The projection 42 is formed in a shape for contacting corresponding area on the tray 2. As shown in FIG. 6(c), back piece 43 has a surface at the same level of those of the projections 42, and can abut against the corresponding area on the tray 2.

As shown in FIG. 3 and FIGS. 7(a)–7(d), the holder 5 is formed in a roughly U-shape with side pieces 45 and a front piece 46. The side pieces 45 are provided with axis parts 47 opposite to each other at lower ends thereof. The axis parts 47 can slide along the guide grooves 34 of the supporting link 3. The front piece 46 has an intermediate portion formed in a gently curved shape and end parts 46a having a linear plate shape. As shown in FIGS. 7(c)–7(d), the ends part 46a has a lateral end 48 projecting from the front piece 46. The lateral end 48 has a pin hole 48a with a diameter same as that of the pin hole 38a. The circular bosses 38 of the supporting link 4 are situated between the lateral ends 48, and the pin holes 38a and pin holes 48a are coaxially communicated.

An assembly of the cup holder device will be explained next. In this structure, the supporting links 3, 4 are connected as shown in FIGS. 6(a)–6(e). The supporting link 3 (base ends 32) is attached to the base ends 39 of the supporting link 4 to be rotatable through the engagement between the axial holes 32a and axis parts 40a. The urging member 7 (coil spring, etc.) is placed in the space 40b so that one end thereof engages the supporting link 4 and the other end thereof engages the supporting link 3. Accordingly, when the supporting links 3, 4 are assembled, they are rotated away from each other around the axis parts 40a due to the urging force of the urging member 7.

Next, the holder 5 is attached to the supporting links 3, 4. In the holder 5, the axis parts 47 are fitted to the guide grooves 34 of the supporting link 3, so that the axis parts 47 of the holder slide freely in the guide grooves 34 of the supporting link 3. Then, the front side 46 of the holder 5 is supported on the front side of the supporting link 4 through the pins 9. In this operation, the circular bosses 38 of the supporting link 4 are inserted between the front side lateral ends 48 of the holder 5. After the spring member 8 is placed in the space 38c, one pin 9 is fitted in the pin holes 48a and pin holes 38a at one side, and the other pin 9 is fitted in the pin hole 48a, spiral spring part of the spring member 9, and pin hole 38a.

In the spring member 8, one end thereof engages the supporting link 4, and the other end thereof engages the holder 46 to produce the urging force. Accordingly, the supporting link 4 and holder 46 rotate in a direction away from each other around the pins 9 due to the urging force of the spring member 8. With the above-mentioned assembly operation, the main members are assembled in an integrated unit as shown in FIG. 2. Therefore, in the embodiment, the main members can be assembled in the tray 2 as the unit, thereby improving the assembling process and parts handling.

As shown in FIG. 2, the axis parts 41a of the supporting link 4 engage the axial holes 29 of the tray 2, thereby assembling the unit. The push-arm 6 is attached to the tray 2 in advance. As shown in FIGS. 8(a)–8(c), the push-arm 6 includes a base part 15 to be placed between the supporting pieces 27 of the tray; a middle plate 16 projecting on the base part 15 and facing the bottom wall 24 of the tray 2; and an abutted plate 17 projecting from an edge of the middle plate 16. The base part 15 includes axis parts 15a projecting at both ends thereof; and vertical ribs 15b disposed in notches at the both ends for sliding. The push-arm 6 is provided with the base part 15 between the supporting pieces 27, and is attached to the tray 2 through the engagement between the axis parts 15a and the axial holes 27a.

As shown in FIG. 8(b), when the tray 2 is pushed into the case 1, the front edge of the case pushes the push-arm to rotate downward to the bottom wall 24 of the tray 2 from a standing state. In other words, when the tray 2 is moved from the pullout position to the stored position relative to the case 1, the push-arm 6 abuts against the front edge of the case 1 and falls down, so that the supporting links 3, 4 are pushed downward. Also, the holder 5 is switched from the use position to the non-use position. This switching process is the same as that of the conventional devices except that the embodiment is provided with the push-arm 6. In this embodiment, the push-arm 6 improves operational characteristics so that the switching operation can be carried out smoothly.

In an operation of the cup holder device as the holder supporting structure, FIG. 4(a) is a view showing a state where an occupant pulls the tray 2 out to the pullout position. The supporting links 3, 4 are urged away from each other with the urging member 7. The supporting link 3 hits the abutted plate 17 of the push-arm 6 at the plate 30 to prevent rotation. The supporting link 4 rotates in a state where the projections 42 of the base ends 39 and the back pieces 43 abut against the bottom wall 24 of the tray 2.

The spring member 8 urges the front side of the holder 5 in a direction away from the supporting link 4, so that the rear side of the holder slides up to the top ends of the guide grooves 34 through the axis parts 47. Accordingly, the supporting links 3, 4 lift the holder 5 up to the maximum level. Therefore, as shown in FIG. 1(a), when the container C is placed into the holder 5 on the bottom wall 24 of the tray 2, the holder 5 and the plate 30 hold the periphery of the container securely.

In the above-mentioned cup holder device, the container C may hit the holder 5 or the occupant may accidentally hit the holder 5. In such a case, the downward load F with various levels is applied to the holder 5. With the holder supporting structure of the present invention, when the value of lowering the load F is within a typical range (for example, F=0.8 kg.f), the holder 5 stays in the use position. When the value of the lower load F exceeds this level, the holder switches from the use position to the non-use position smoothly, thereby avoiding damage.

In the structure, the supporting link 4 is stably maintained in the standing position in a state that the projections 42 and the back pieces 43 abut against the bottom wall 24 of the tray 2. The supporting link 3 moves upward with the axis supporting portions (the engagement between the axis parts 41a and the axial holes 32a) as pivots. At that time, the projected parts 35 come to contact the depressed parts 28a on the bottom wall 24 of the tray 2, and press with a gradually increasing force. The supporting link 3 then stands in the vertical state relative to the tray 2, and the projected parts 35 rotate to push up the holder in a state where the supporting link 4 is supported at the axis parts 41a.

The axis parts 40a are strongly pressed against inner faces of the axial holes 32a. Accordingly, a gap in the axis supporting portions (between the axis parts 40a and the axial holes 32a) is created only at one side, thereby eliminating a play. Further, the supporting link 3 is strongly pressed against the depressed parts 28a of the tray 2 through the projected parts 35, thereby creating large friction. Due to these effects, the supporting link 3 is stably held in the standing position along with the supporting link 4.

The supporting link 3 maintains the standing position even when a relatively large load F is applied through the holder 5. When an excessive load F is applied through the holder 5, the supporting link 3 moves downward easily as the projected parts 35 slide smoothly. The supporting link 4 moves downward easily around the axis parts 41a due to the excessive load from the supporting link 3 and the holder 5. Accordingly, as shown in FIG. 4(b), the holder 5 is folded in the non-use position.

In this structure, the supporting link 3 is pivotally supported on the supporting link 4. The projected parts 35 move along the parts 41 of the base ends 39 of the supporting link 4. The projections 42 are situated behind the axis parts 41a. Due to these features, the holder moves very smoothly. As described above, the holder 5 moves to the non-use position through the supporting links 3, 4 when an excessive load F is applied. In this case, the holder returns to the use position when the excessive load F is removed.

The present invention is not limited to the abovementioned embodiments. The invention can be modified within the scope of the claims. For example, it is possible to omit the push-arm 6; it is possible to change the shape of the guide grooves 34; and it is possible to change the locations of the urging member 7 and the spring member 8.

As described above, in the cup holder device of the present invention, the first supporting link includes the projected parts at the base ends thereof, and the projected parts come to contact the tray, and push the tray with the gradually increasing force. Therefore, even when the relatively large load F is applied to the holder, as shown in FIG. 4(a), the holder maintains the standing position easily. At the same time, the holder moves smoothly to the non-use position with the excessive load F. Accordingly, the holder has an excellent balance of the operation, and the design can be expanded freely with the improved reliability.

While the present invention has been explained with the specific embodiments of the invention, the explanation is illustrative and the invention is limited only by the appended claims.

What is claimed is:

1. A cup holder device for holding a container, comprising:
   a case,
   a tray having front and rear sides, and arranged to move between a stored position where the tray is stored in the case and a pullout position where the tray is pulled out of the case,
   a holder having front and rear sides and disposed on the tray to move between a non-use position where the holder is stored in the tray and a use position where the holder is located above the tray,
   a first supporting link having one end side rotatably and slidably attached to the rear side of the holder and the other end side rotatably disposed relative to the tray to be able to rotate upwardly to support the tray at the use position, said first supporting link including a projected portion at the other end side so that the projected portion comes to contact the tray and pushes the tray with a gradually increasing force as the first supporting link rotates upward,
   a second supporting link having one end side rotatably attached to the front side of the holder, and the other end side rotatably attached relative to the tray to be able to rotate upward to support the holder at the use position, and
   urging means attached to at least one of the first and second supporting links for urging the at least one of the first and second supporting links upwardly.

2. A cup holder device as claimed in claim 1, wherein said holder has a horseshoe shape for holding the container at an inner periphery thereof, and said first supporting link includes a plate situated between two ends of the horseshoe shape for holding the container together with the holder when the holder is at the use position, said projected parts being formed on two sides of an end of the plate.

3. A cup holder device as claimed in claim 2, wherein said first supporting link is rotatably connected to the second supporting link at the other end side, and said urging means includes a first urging member disposed between the first supporting link and the second supporting link for urging the first supporting link to rotate upward.

4. A cup holder device as claimed in claim 3, wherein said plate of the first supporting link includes guide grooves at two sides on the one end side thereof, and said holder includes axis parts at the rear end side so that the axis parts are slidably fit in the guide grooves.

5. A cup holder device as claimed in claim 1, wherein said urging means includes a second urging member disposed between the second supporting link and the holder for urging the second supporting link to rotate upward, said second supporting link having a base portion at the other end side thereof, said first supporting link being rotatably supported on the base portion.

6. A cup holder device as claimed in claim 1, wherein said second supporting link includes, at the other end side, a base portion, a front with a height higher than that of the base portion, and a projection extending rearwardly from the base portion so that when the second supporting link rotates upward in the use position, the projection abuts against the tray.

7. A cup bolder device as claimed in claim 1, further comprising a push-arm attached to the case for rotating and pushing the first supporting link downward when the tray is pushed into the case.

* * * * *